No. 742,772. PATENTED OCT. 27, 1903.
C. W. H. BLOOD.
VERTICAL FEED TRANSVERSE CUTTING MACHINE.
APPLICATION FILED SEPT. 12, 1902.
NO MODEL.
3 SHEETS—SHEET 1.
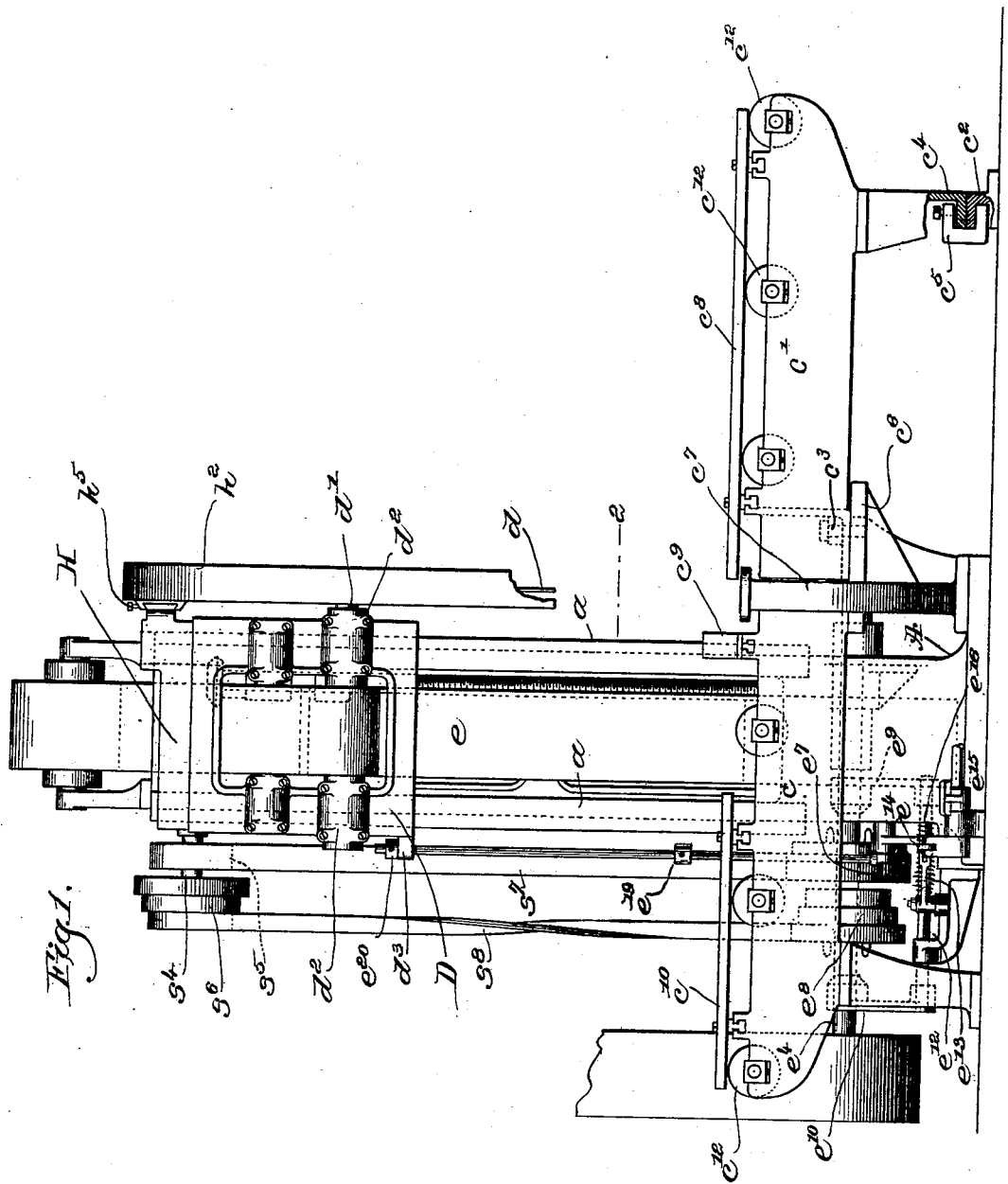

No. 742,772. PATENTED OCT. 27, 1903.
C. W. H. BLOOD.
VERTICAL FEED TRANSVERSE CUTTING MACHINE.
APPLICATION FILED SEPT. 12, 1902.
NO MODEL. 3 SHEETS—SHEET 2.
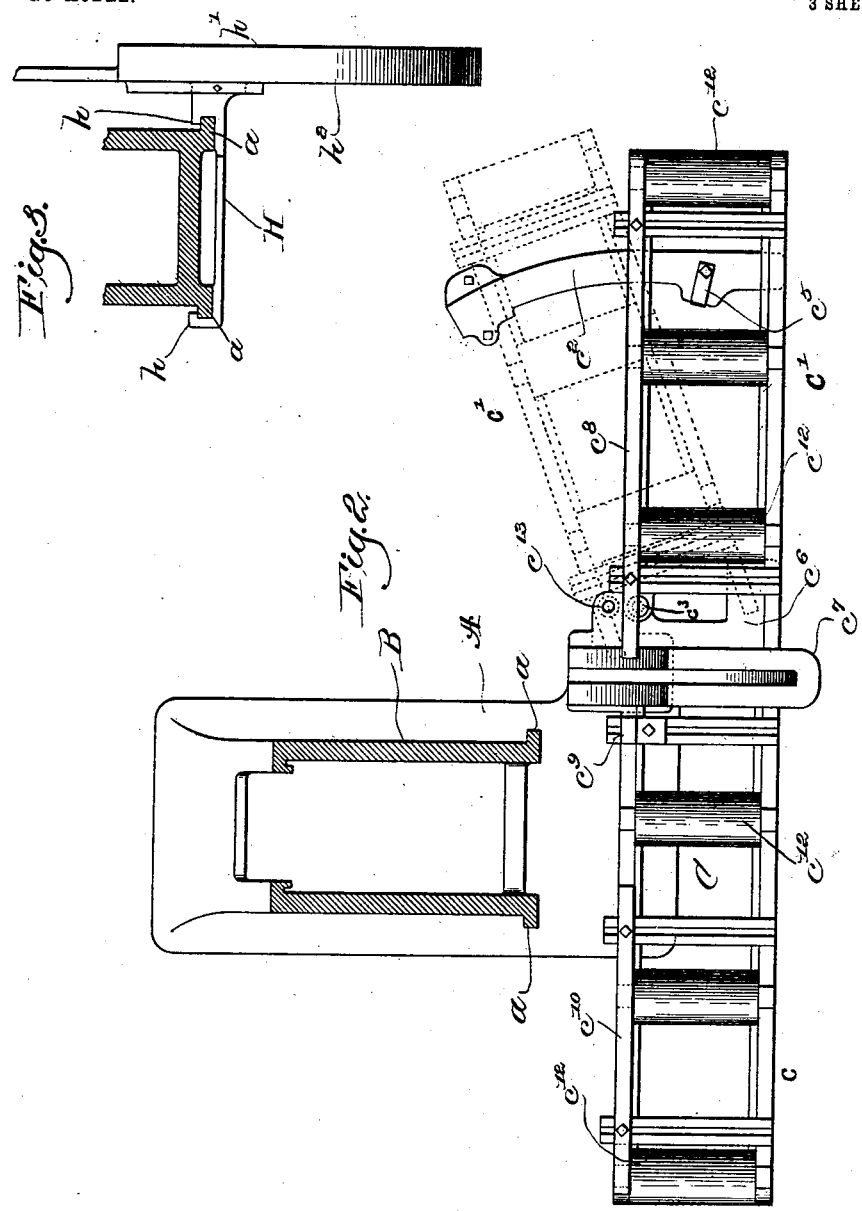

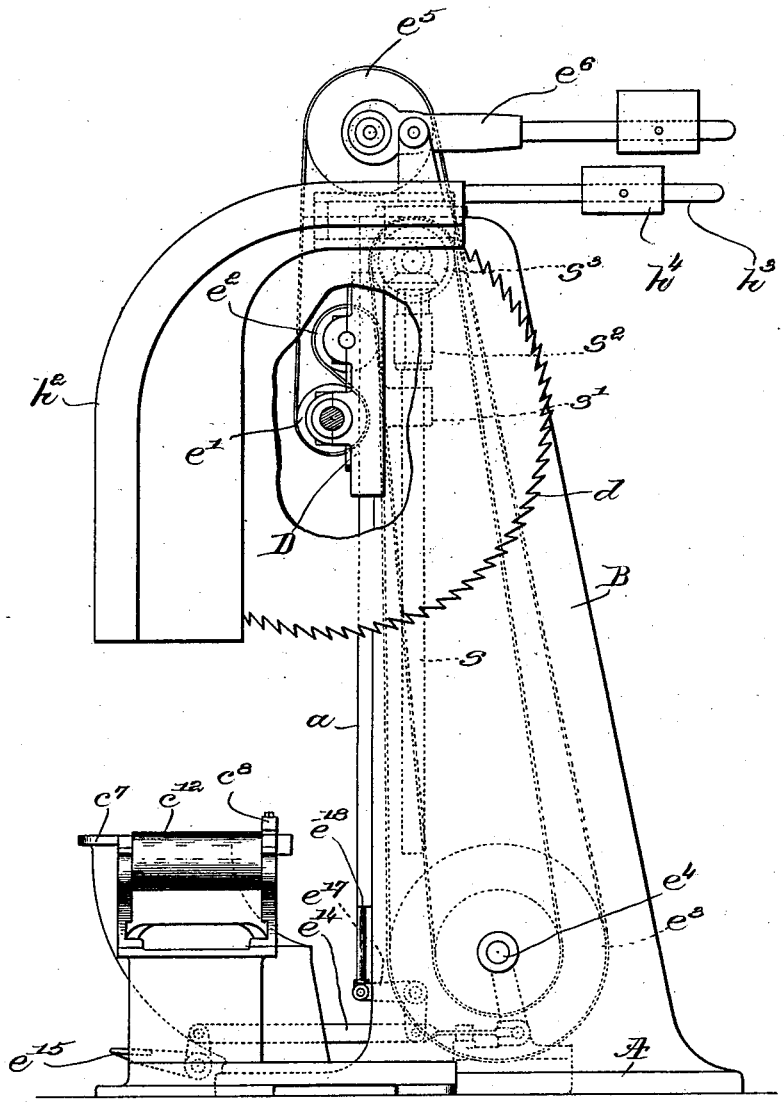

No. 742,772.

Patented October 27, 1903.

UNITED STATES PATENT OFFICE.

CHARLES W. H. BLOOD, OF BOSTON, MASSACHUSETTS, ASSIGNOR TO S. A. WOODS MACHINE COMPANY, OF BOSTON, MASSACHUSETTS.

VERTICAL-FEED TRANSVERSE-CUTTING MACHINE.

SPECIFICATION forming part of Letters Patent No. 742,772, dated October 27, 1903.

Application filed September 12, 1902. Serial No. 123,069. (No model.)

*To all whom it may concern:*

Be it known that I, CHARLES W. H. BLOOD, a citizen of the United States, and a resident of Boston, county of Suffolk, State of Massachusetts, have invented an Improvement in Vertical-Feed Transverse-Cutting Machines, of which the following description, in connection with the accompanying drawings, is a specification, like letters on the drawings representing like parts.

My invention is a machine for severing or cutting across or into timbers, and is particularly intended for handling heavy timbers, the construction being such that the saw or tool approaches the timber from the top, the saw meanwhile being guarded by a shield and the latter remaining on top of the timber as the saw enters and descends into the latter, said shield being carried up by the saw or saw-carrying frame as the latter moves away from the timber after having done its work.

Also my invention provides means for enabling the timber to be cut square at one end and beveled or oblique at the other end without changing the adjustment of the table.

Various other features of invention and advantages thereof are embodied in the machine and will be pointed out more fully in the course of the following description, reference being had to the accompanying drawings, illustrative of one embodiment of my invention.

In the drawings, Figure 1 is a front elevation of the machine, parts being broken away and shown in section for clearness of understanding. Fig. 2 is a transverse horizontal section thereof, taken on the line 2, Fig. 1, said figure showing the table in top plan view. Fig. 3 is a detail view showing in top plan the shield-carrier and the adjacent parts in section. Fig. 4 is a side elevation viewing Fig. 1 from the right.

Extending from a suitable base A is a vertical column B and a bed C. The column at its front face is provided with opposite guides $a$, herein shown as projecting laterally away from each other, to provide guide-flanges along which the tool-carrier D may slide, as clearly shown in Figs. 1 and 4.

The bed C consists of a stationary part $c$ and a movable part $c'$, the latter being capable of moving in an arc, herein shown as directed by a track $c^2$ and as pivoted or hinged on a pivot-pin $c^3$ to the stationary part $c$, the outer or swinging end of the movable part $c'$ being provided with a leg $c^4$, resting on the track $c^2$ and adapted to be clamped rigidly in any adjustment by a locking device or clamp $c^5$. The inner end of the movable part $c'$ is herein shown as supported on a ledge or bracket $c^6$, extending from the adjacent end of the stationary part $c$. Adjacent thereto the stationary part is provided with a vertical chamber or channel $c^7$ to receive the tool, which is herein shown as a circular saw $d$, mounted on the end of an arbor $d'$, journaled at $d^2$ in the tool-carrier D and driven by a belt $e$, passing under a pulley $e'$ on said arbor $d'$ and over an idler $e^2$, also mounted on the tool-carrier D, and thence passing downwardly over a driving-pulley $e^3$, mounted on the drive-shaft $e^4$, and up over a binder-pulley $e^5$, mounted on the top of the column B, said binder-pulley being pivoted in usual manner on the projecting ends of counterbalance-levers $e^6$ for maintaining the belt taut.

Mounted in any suitable manner to be capable of movement independent of the tool-carrier D is a shield-carrier H, herein shown (see particularly Fig. 3) as provided with arms $h$, embracing the guideways $a$ and resting directly on top of the tool-carrier and carrying the same by gravity. This shield-carrier is provided at its end adjacent the saw with a guiding-surface, herein shown as a dovetail arm $h'$, on which is mounted a shield $h^2$, which incloses the saw or other tool to such a degree as may be required or advisable, according to the situation. Preferably, also, the shield is provided with a counterbalance-arm $h^3$, extending rearwardly, and an adjustable weight $h^4$ to compensate for any forward or rearward adjustment of the shield to suit different sizes of saws which may be used, the shield being held in adjustment by any suitable means, as by a set-screw $h^5$.

From the foregoing description it will be evident that when the saw and shield descend to the work the shield upon coming in contact therewith simply stops and the saw continues to descend as the operator may require. The feeding of the saw up and down may be accomplished in any convenient manner, a reversible screw $s$ being herein shown as provided for that purpose, working in a nut $s'$ on the rear side of the tool-carrier D and carried by a wheel $s^2$ on the column, being driven by a bevel-gear $s^3$ on a shaft $s^4$, containing reversing-pulleys $s^5$ $s^6$, the latter being shown as a step-pulley for giving downward movement at different degrees of speed. These pulleys are driven by belts $s^7$ $s^8$, passing over corresponding pulleys $e^7$ $e^8$ on the drive-shaft $e^4$. These pulleys coöperate with usual clutch mechanism $e^9$ $e^{10}$ on a longitudinally-movable shaft $e^{12}$, reciprocated by a bell-crank $e^{13}$, connected by a link $e^{14}$ with a foot-lever $e^{15}$, moving in opposition to a spring $e^{16}$ on the shaft $e^{12}$. Also connected with said link $e^{14}$ by a bell-crank $e^{17}$ is an automatic reversing and stopping rod $e^{18}$, provided with a reversing-block $e^{19}$ and a stop-block $e^{20}$ to be engaged by a lug $d^3$ of the carrier D, traveling over said rod.

The table is provided with fences or gages $c^8$ $c^9$ $c^{10}$ and feed-rolls $c^{12}$ in usual manner. When the table is to be used in a straight line, it is placed as shown in full lines in Fig. 2; but when the movable part is to be swung around at an angle to the stationary part the pin $c^3$ is withdrawn from engaging with the bracket $c^6$ and the table $c'$ is then shoved straight back until the pin $c^3$ drops into a second pivot-hole $c^{13}$, thereby carrying the center of movement of the movable table back correspondingly, so that the timber will approach the saw relatively to the center of the latter as nearly as possible in the same relation as it did when the table was in its other adjustment. In other words, by moving the pivot back to the hole $c^{13}$ I gain saw distance, which is of considerable importance in treating heavy timbers, because such timbers being large require a large saw, and hence when a timber is being sawed obliquely it is evident that if the pivot-point were not shifted back as shown in Fig. 2 the projecting end of the timber would be carried forward unduly, and hence would require a much larger saw, greater power, and a heavier machine, whereas by moving the pivot-point back the timber is caused to meet the saw as nearly in vertical alinement with the center as is possible. A further advantage of the provision of a stationary part and a swinging part of the table is of special importance in connection with this same class of timbers, which, as is well known, are very seldom required to be cut square across at both ends, but are usually cut with one end square and the opposite end beveled—as, for instance, in car-braces. This can be accomplished by my invention without requiring an alteration of the table, inasmuch as the timber can simply be fed in from the right-hand end of the machine, and when the advance end is in proper position beneath the saw the bevel cut is made, and then the timber is simply fed along onto the stationary part $c$ until the rear end of the timber comes to proper position, when the square cut is made, the two gages $c^8$ $c^{10}$ (and $c^9$) being in proper relation to the saw for accomplishing this result.

In operation the table is first adjusted to the exact requirements of the work, and then, the timber having been fed to position, the operator depresses the treadle, whereupon the saw and shield descend, the latter engaging the work and remaining on top thereof, while the saw descends to the depth required by the reversing-block $e^{19}$, and when the carrier D meets the latter it automatically reverses the saw, carrying the same into its upper position, where it stops. When the shield first engages the timber, the shield-carrier H simply stops or halts on the guides, while the saw-carrier D continues to move down farther along the latter. If a larger or smaller saw or other tool is required, the shield is moved out or in, as required, simply by loosening the set-screw $h^5$ and shoving it along the guide-arm $h$.

By the term "saw" I do not mean to restrict myself to a circular saw, but mean to include any transversely-cutting tool.

Without undertaking to set forth all the advantages of my invention and the arrangements and modifications of parts which are within the spirit and scope of my invention, what I claim, and desire to secure by Letters Patent, is—

1. A machine of the kind described for handling heavy timber, comprising a work-support, a tool-carrier movable up and down relatively thereto, a circular saw carried thereby, a shield inclosing the top and front edge of said saw for the entire vertical length of the latter, and said shield being freely movable toward and from said saw independently of the latter, the shield preventing the operator from being able to come in contact with the saw.

2. A machine of the kind described for handling heavy timbers, comprising a work support or table, a tool and tool-carrier movable up and down relatively thereto, said table having a stationary part for supporting the timbers, and a movable part for supporting the timbers, the supporting-surfaces of both of said parts being in the same horizontal plane, and means for horizontally adjusting the latter part obliquely to the former part without interfering with the proper action of said tool.

3. A machine of the kind described for handling heavy timbers, comprising a table made of a movable supporting part and a stationary supporting part, a saw and saw-carrier movable vertically above said stationary part for cutting said timbers transversely thereof, said movable part being movable obliquely to said stationary part, and provided with means for shifting the rear pivotal end of said movable part next to the saw backward toward the center line of the saw for gaining saw distance.

4. A machine of the kind described for handling heavy timbers, comprising a work-support, a tool-carrier movable up and down relatively thereto, a tool carried thereby, a shield for said tool, said shield extending the vertical length of said tool and embracing the exposed front portion of said tool for said entire length, means for permitting said shield to halt at the work while the tool penetrates the latter, and means for adjusting said shield in and out transversely of the direction of movement of the tool.

5. A machine of the kind described for handling heavy timbers, comprising a work-supporting, a vertical guide, a tool and tool-carrier mounted to slide thereon, a shield and shield-carrier also mounted to slide thereon, and resting freely on said tool-carrier, whereby when the shield contacts with the work, it automatically stops and permits the tool to continue forward.

6. A machine of the kind described for handling heavy timbers, comprising a horizontal work-table composed of two parts pivotally connected, one of said parts being stationary, and the other part capable of swinging in a horizontal plane, each of said parts being provided with a supporting-surface consisting of transverse feed-rolls, gages coöperating with said feed-rolls, and a tool and tool-carrier movable vertically above said stationary part, adjacent said movable part.

7. A machine of the kind described for handling heavy timbers, comprising a tool and tool-carrier movable vertically, a work-support composed of a stationary part having transverse feed-rolls for receiving the timber, a movable part also having transverse feed-rolls for receiving a timber, a track adjacent the outer end of said movable part, said movable part having a leg resting on the track, means for clamping the same in adjustment on said track, and means pivotally connecting the inner ends of said movable part and stationary part.

8. A machine of the kind described for handling heavy timbers, comprising a work-table, a tool and tool-carrier movable vertically above said table, said table comprising a stationary part provided at one end with a horizontal ledge, a movable part adapted at its inner end to rest on said ledge, said movable part when so resting having its upper surface on a horizontal level with the upper surface of said stationary part, means permitting said movable part to swing horizontally with relation to said stationary part, and two pivotal connections for said movable part, said movable part being shiftable from one to the other, said tool being located above the end of the stationary part next to the movable part.

In testimony whereof I have signed my name to this specification in the presence of two subscribing witnesses.

CHARLES W. H. BLOOD.

Witnesses:
  F. A. CHENEY,
  R. S. CROSSKILL.